US008968148B2

(12) United States Patent
Matsuoka et al.

(10) Patent No.: US 8,968,148 B2
(45) Date of Patent: Mar. 3, 2015

(54) PLANETARY GEAR REDUCER

(75) Inventors: Tetsuya Matsuoka, Kakogawa (JP);
Hiroyasu Nishikawa, Kobe (JP);
Kazuhiro Sato, Kakogawa (JP);
Hideyuki Imai, Akashi (JP); Tatsuhiko Goi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/989,329

(22) PCT Filed: Nov. 15, 2011

(86) PCT No.: PCT/JP2011/006359
§ 371 (c)(1),
(2), (4) Date: Jul. 26, 2013

(87) PCT Pub. No.: WO2012/070199
PCT Pub. Date: May 31, 2012

(65) Prior Publication Data
US 2013/0310213 A1 Nov. 21, 2013

(30) Foreign Application Priority Data

Nov. 25, 2010 (JP) .................................. 2010-262127

(51) Int. Cl.
*F16H 57/08* (2006.01)
*F16H 1/28* (2006.01)
(52) U.S. Cl.
CPC .................. *F16H 1/28* (2013.01); *F16H 1/2818* (2013.01); *F16H 57/082* (2013.01)
USPC .......................................... 475/331; 475/347

(58) Field of Classification Search
USPC ........................................... 475/331, 346, 347
See application file for complete search history.

(56) References Cited

U.S. PATENT DOCUMENTS

| 5,433,674 | A | 7/1995 | Sheridan et al. | |
| 6,223,616 | B1 * | 5/2001 | Sheridan | ......................... 74/468 |

(Continued)

FOREIGN PATENT DOCUMENTS

| EP | 2 241 780 A2 | 10/2010 |
| JP | 59-188340 U | 12/1984 |

(Continued)

OTHER PUBLICATIONS

Extended European Search Report, dated Dec. 16, 2014, issued in corresponding European Patent Application No. 11843458.8.

*Primary Examiner* — Gene Crawford
*Assistant Examiner* — Lillian Nguyen
(74) *Attorney, Agent, or Firm* — Sughrue Mion, PLLC

(57) ABSTRACT

Provided is a planetary gear reducer including: a sun gear fixed concentrically to a power input shaft; a plurality of planet gears meshing with the sun gear; a ring gear meshing with the planet gears; a planet carrier configured to support a plurality of planet shafts, each of which is a rotational axis of a corresponding one of the planet gear, and to output revolution of the plurality of planet gears as first power; and a cylindrical support connected to the ring gear, non-rotatable relative to the ring gear, and configured to output rotation of the ring gear as second power. The cylindrical support includes, at one part along the direction of a central axis, a flexible structure which is curved radially inward and has a V-shaped longitudinal section. This configuration improves rigidity and prevents misalignment without increasing the weight of the gear reducer.

10 Claims, 4 Drawing Sheets

(56) References Cited

U.S. PATENT DOCUMENTS

| | | | |
|---|---|---|---|
| 2005/0055953 A1* | 3/2005 | Sacks et al. | 52/633 |
| 2007/0225111 A1* | 9/2007 | Duong et al. | 475/331 |
| 2010/0115741 A1* | 5/2010 | Trifari, Jr. | 24/458 |
| 2010/0261571 A1 | 10/2010 | Matsuoka et al. | |
| 2011/0105270 A1* | 5/2011 | Matsuoka et al. | 475/331 |
| 2013/0095974 A1* | 4/2013 | Imai et al. | 475/159 |
| 2013/0102432 A1* | 4/2013 | Imai et al. | 475/159 |

FOREIGN PATENT DOCUMENTS

| | | |
|---|---|---|
| JP | 62-86448 U | 6/1987 |
| JP | 2-94815 U | 7/1990 |
| JP | 5-47602 U | 6/1993 |
| JP | 2010-181033 A | 8/2010 |

* cited by examiner

PLANETARY GEAR REDUCER

CROSS REFERENCE TO RELATED APPLICATIONS

This application is a National Stage of International Application No. PCT/JP2011/006359 filed Nov. 15, 2011, claiming priority based on Japanese Patent Application No. 2010-262127, filed Nov. 25, 2010, the contents of all of which are incorporated herein by reference in their entirety.

TECHNICAL FIELD

The present invention relates to a planetary gear reducer mainly used in a power transmission mechanism of an aircraft.

BACKGROUND ART

Conventionally, planetary gear reducers have been installed in power transmission mechanisms for use in extracting power from a power source such as an aircraft gas turbine engine. Such a planetary gear reducer includes: a sun gear having external teeth; a plurality of planet gears having external teeth and meshing with the sun gear; a shared planet carrier supporting the rotational axis of each planet gear and positioning the plurality of planet gears relative to each other; and a ring gear having internal teeth and meshing with the plurality of planet gears (see Patent Literature 1, for example). In the planetary gear reducer having such a configuration, power that is generated from a power source is, for example, inputted into the sun gear first, then transmitted to the planet gears, and thereafter the power can be extracted from the planet gears as two different kinds of outputs. Specifically, the power transmitted to the planet gears can be extracted as rotative power of the ring gear that is derived from rotation of the planet gears and as rotative power of the planet carrier that is derived from revolution of the planet gears around the sun gear.

CITATION LIST

Patent Literature

PTL 1: U.S. Pat. No. 5,433,674

SUMMARY OF INVENTION

Technical Problem

In such a planetary gear reducer installed in an aircraft engine as described above, the rotating shaft of the gear reducer is supported at one end by the engine structure, and a propeller is fixed to the distal end of the rotating shaft. Therefore, there are cases where when the propeller rotates during the flight of the aircraft, a bending moment is exerted on the engine, which results in the occurrence of bending deformation of the engine structure. Further, there are cases where due to the effect of such bending deformation of the engine structure, bending deformation occurs over the entire gear reducer. Due to the bending deformation thus occurring over the entire planetary gear reducer, the planet gears, the sun gear meshing with the planet gears, and the ring gear become no longer parallel to one another, that is, become misaligned. If there is such misalignment among the planet gears, the sun gear, and the ring gear, then edge contact occurs at the gears or bearings, which causes chipping of the gear teeth or accelerates the wear of the gear teeth. As a result, the life of the planetary gear reducer is reduced.

One of the conceivable ways to prevent the occurrence of such misalignment is, for example, to use a structure that supports both ends of the rotating shaft. However, incorporating such a structure supporting both ends of the rotating shaft into an engine causes an increase in the engine weight. Patent Literature 1 discloses configuring the entire supports for both the sun gear and the ring gear as flexible structures so as to absorb deformation of the engine structure. This is another way to prevent the occurrence of misalignment. In this case, however, when both the sun gear and the ring gear rotate, the rigidity of these support structures for the rotation system becomes insufficient, resulting in the occurrence of excessive whirling.

The present invention has been made to solve the above problems, and an object of the present invention is to provide a planetary gear reducer with excellent life performance, which makes it possible to both obtain rigidity and prevent misalignment without causing an increase in the overall weight of the gear reducer.

Solution to Problem

In order to achieve the above object, a planetary gear reducer according to the present invention includes: a sun gear having external teeth and fixed concentrically to a power input shaft; a plurality of planet gears having external teeth and meshing with the sun gear; a ring gear having internal teeth and meshing with the planet gears; a planet carrier configured to support a plurality of planet shafts, each of which is a rotational axis of a corresponding one of the planet gears, and to output revolution of the plurality of planet gears around the input shaft as first power; and a cylindrical support connected to the ring gear such that the cylindrical support is non-rotatable relative to the ring gear, the cylindrical support being configured to output rotation of the ring gear as second power. The cylindrical support includes, at its one part along a direction of a central axis, a flexible structure 41 which is curved radially inward and has a V-shaped longitudinal section.

According to the above configuration, among three input/output components supporting the planetary gear reducer, i.e., the input shaft, the planet carrier, and the cylindrical support, only the cylindrical support is provided with the flexible structure which has a V-shaped cross section and low rigidity. Accordingly, sufficient rigidity for preventing the whirling of the gear reducer is obtained. This consequently allows an engine in which the planetary gear reducer is installed to have a structure that supports the rotating shaft of the gear reducer at one end of the shaft. Therefore, an increase in the engine weight is suppressed. In addition, according to the above configuration, deformation of the engine due to flight loads and the like can be absorbed by the flexible structure, and thereby the occurrence of misalignment is prevented. As a result, the occurrence of edge contact at the gears or bearings is suppressed, and the life performance of the planetary gear reducer is improved significantly.

In the above planetary gear reducer, an angle of the V-shape of the longitudinal section of the flexible structure is preferably in a range from 30° to 90°. This configuration makes it possible to obtain suitable flexibility for preventing misalignment while maintaining sufficient strength against buckling of the cylindrical support.

In the above planetary gear reducer, the cylindrical support preferably includes a larger-diameter cylindrical portion and a smaller-diameter cylindrical portion. The larger-diameter cylindrical portion is formed nearer to the ring gear than the flexible structure, and the smaller-diameter cylindrical portion is formed nearer to an output side of the cylindrical support than the flexible structure. It is preferred that the larger-diameter cylindrical portion has a wall thickness set to be smaller than that of the flexible structure. According to this configuration, the wall thickness of the larger-diameter portion which is subjected to less shear force is made smaller. This makes it possible to reduce the weight of the planetary gear reducer while maintaining necessary strength against buckling.

Preferably, in the above planetary gear reducer, the ring gear includes an outward flange protruding radially outward; the cylindrical support includes an inward flange protruding radially inward; and the ring gear and the cylindrical support are connected to each other via the outward flange and the inward flange. According to this configuration, the external dimensions of the planetary gear reducer are reduced, which makes it possible to reduce the size and weight of an engine in which the gear reducer is installed.

In the above planetary gear reducer, it is preferred that connection portions connecting the outward flange and the inward flange are each configured in a form of a chevron-shaped pattern. According to this configuration, the outer peripheral portion of the ring gear is configured in the form of a chevron-shaped pattern. That is, counterbores formed in a wave-like shape are provided at the outer peripheral portion of the ring gear. This makes it possible to reduce the weight of the planetary gear reducer while maintaining the rigidity of the ring gear.

Advantageous Effects of Invention

As described above, the planetary gear reducer according to the present invention makes it possible to prevent misalignment while maintaining its rigidity without causing an increase in the overall weight of the gear reducer. Therefore, the planetary gear reducer according to the present invention has significantly improved life performance.

DESCRIPTION OF EMBODIMENTS

Figure 1:
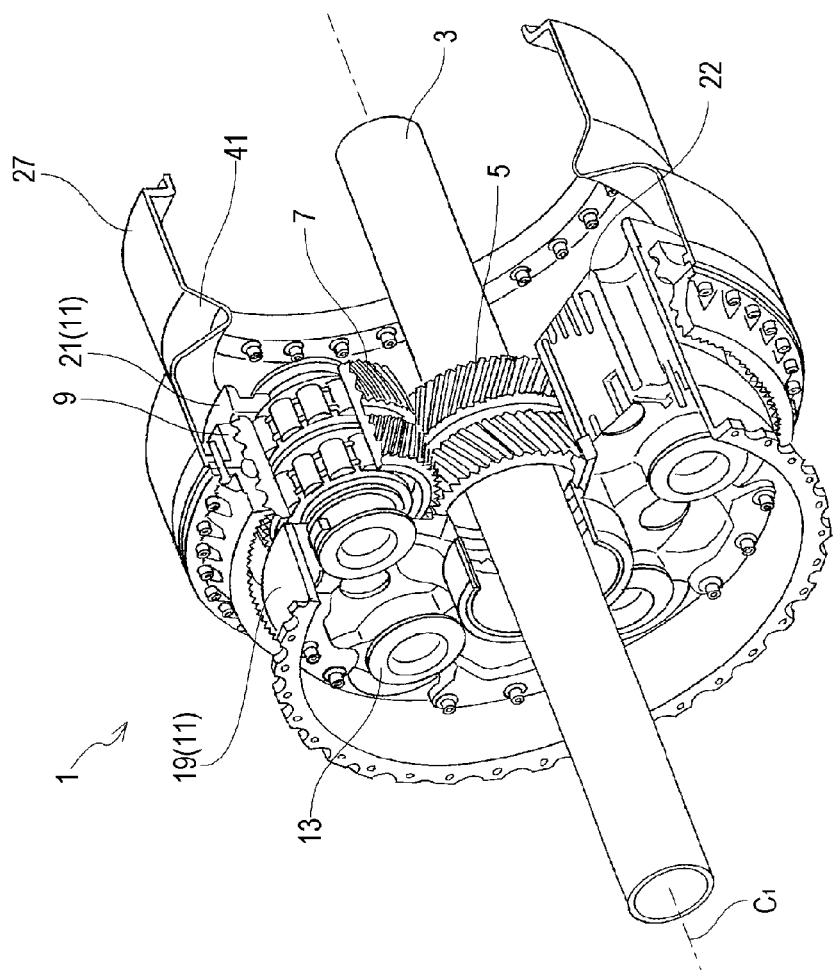
FIG. 1 is a partially cutaway perspective view showing a planetary gear reducer according to one preferred embodiment of the present invention.

Hereinafter, one preferred embodiment of the present invention is described with reference to the drawings. FIG. 1 is a perspective view showing a planetary gear reducer 1 according to the embodiment of the present invention. The planetary gear reducer 1 is installed in, for example, the engine of a propeller-driven aircraft. The planetary gear reducer 1 is connected to a gas turbine engine, which is not shown, via an input shaft 3. The planetary gear reducer 1 transmits power of the gas turbine engine to two rotors, which are not shown, as respective separate outputs. It should be noted that in the description below, along the axial direction of the input shaft 3 (i.e., along a direction in which a central axis $C_1$ extends), one side at which the gas turbine engine is disposed (i.e., the left side in FIG. 1) is referred to as a front side (or forward), and the opposite side is referred to as a rear side (or backward).

Figure 2:
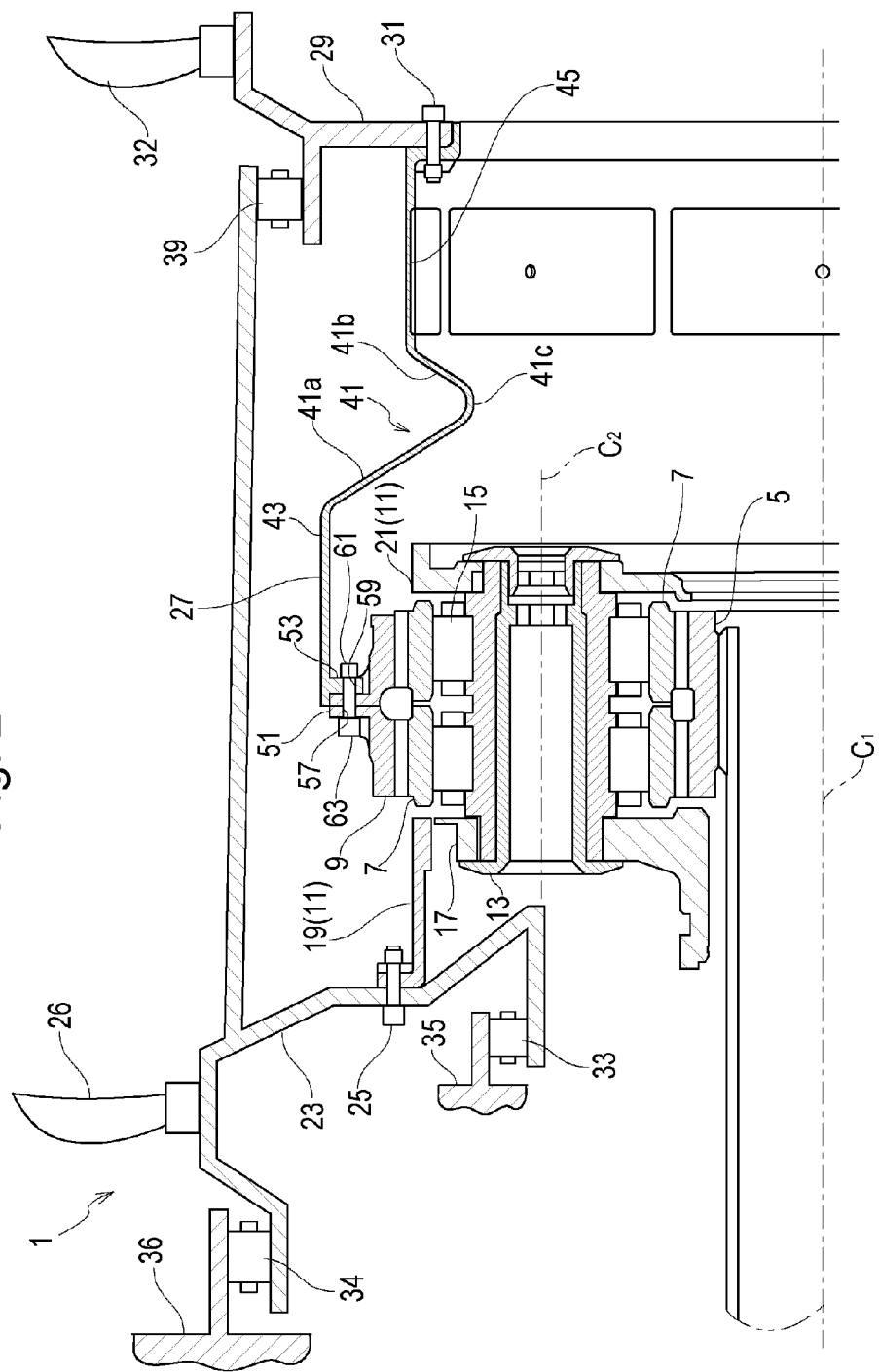
FIG. 2 is a longitudinal sectional view of the planetary gear reducer of FIG. 1.

FIG. 2 is a longitudinal sectional view showing a main part of the planetary gear reducer 1 of FIG. 1. As shown in FIG. 2, the planetary gear reducer 1 is configured as a double-row gear mechanism which includes: a sun gear 5; a plurality of planet gears 7; a ring gear 9; a planet carrier 11; and planet shafts 13. The sun gear 5 is a double helical gear in which the helical gears have respective sets of external teeth, the sets of external teeth being inclined in respective directions that are opposite to each other. The sun gear 5 is fitted to the outer periphery of the input shaft 3 which is a rotating shaft. Each planet gear 7 includes helical gears corresponding to the sun gear 5 and has double rows of external teeth. Each planet gear 7 is meshed with the sun gear 5 while each planet gear 7 is rotatably fixed, via a respective double row bearing 15, to the outer periphery of a corresponding planet shaft 13 having a hollow center. The planet shaft 13 serves as the rotational axis of the planet gear 7. In the present embodiment, five planet gears 7 are arranged at the outer periphery of the sun gear 5 in a circumferential direction at regular intervals. The ring gear 9 is a double helical gear having internal teeth. The ring gear 9 is meshed with each planet gear 7.

The front end of each planet shaft 13 is supported by an annular front plate 17 which shares the same central axis $C_1$ with the input shaft 3. The front plate 17 is connected, via multiple bolts, to the inner peripheral portion of a stub shaft 19 which is a cylindrical shaft disposed concentrically to the front plate 17. A back plate 21 is connected to the back of the front plate 17. Specifically, a plurality of supports 22 (FIG. 1), which are arranged in a circumferential direction at regular intervals, are integrally formed with the back plate 21. The back plate 21 is bolted to the front plate 17 via the supports 22. The rear end of each planet shaft 13 is supported by the back plate 21. Thus, the stub shaft 19, and the front plate 17 and the back plate 21 connected to each other via the stub shaft 19, form the planet carrier 11 which supports the planet shafts 13 and the planet gears 7. The planet carrier 11 determines the relative positions among the planet shafts 13, i.e., the relative positions among the planet gears 7.

The front end of the stub shaft 19 is connected by bolts 25 to a forward output shaft 23 which is concentric to the input shaft 3. Accordingly, power derived from revolution of the plurality of planet gears 7 around the central axis $C_1$ is outputted, for example, to a propeller 26 at the front side via the stub shaft 19 and the forward output shaft 23 as driving force (first power). Meanwhile, the ring gear 9 is connected to a flexible support 27 which is a cylindrical support disposed concentrically to the input shaft 3. The rear end of the flexible support 27 is connected by bolts 31 to a backward output shaft 29 which is concentric to the input shaft 3. A structure connecting the ring gear 9 and the flexible support 27 will be described below in detail. Power derived from rotation of each planet gear 7 around its central rotational axis $C_2$ is outputted, for example, to a propeller 32 at the rear side via the ring gear 9, the flexible support 27, and the backward output shaft 29 as driving force (second power). It should be noted that the forward output shaft 23 is rotatably supported, via bearings 33 and 34, by fixed shafts 35 and 36 of the engine in which the planetary gear reducer 1 is installed. The forward output shaft 23 and the backward output shaft 29 are supported via a rear bearing 39, such that the forward output shaft 23 and the backward output shaft 29 can rotate relative to each other.

As described above, the entire planetary gear reducer 1 is supported at the front side by the input shaft 3 and the stub shaft 19, and supported at the rear side by the flexible support 27. The input shaft 3 and the stub shaft 19 (planet carrier 11) are formed as highly rigid components. On the other hand, the flexible support 27 is formed as a component including a low-rigidity portion, which is described below.

The flexible support 27 includes, at its one part along the central axis direction, a flexible structure 41 which is curved radially inward and has a V-shaped longitudinal section. The term "longitudinal section" herein refers to a cross section substantially parallel to an axial direction that extends along the central axis $C_1$ of the input shaft 3. In the present embodiment, the flexible support 27 includes a larger-diameter cylindrical portion 43 formed at the ring gear 9 side and a smaller-diameter cylindrical portion 45 formed at the backward output side. The flexible structure 41 is formed between these cylindrical portions 43 and 45. The larger-diameter cylindrical portion 43 is formed such that the diameter thereof is larger than that of the smaller-diameter cylindrical portion 45. The flexible structure 41 is formed such that the flexible structure 41 is curved radially inward from both the rear end of the larger-diameter cylindrical portion 43 and the front end of the smaller-diameter cylindrical portion 45 in a manner to form a V-shaped longitudinal section. In other words, the flexible structure 41 includes a front inclined portion 41a and a rear inclined portion 41b. The front inclined portion 41a is inclined radially inward so as to be tapered backward from the rear end of the larger-diameter cylindrical portion 43. The rear inclined portion 41b is inclined radially inward so as to be tapered forward from the front end of the smaller-diameter cylindrical portion 45. A turn portion 41c between the front inclined portion 41a and the rear inclined portion 41b is the minimum diameter portion of the flexible support 27. The turn portion 41c has an arc-like longitudinal section.

Figure 3:
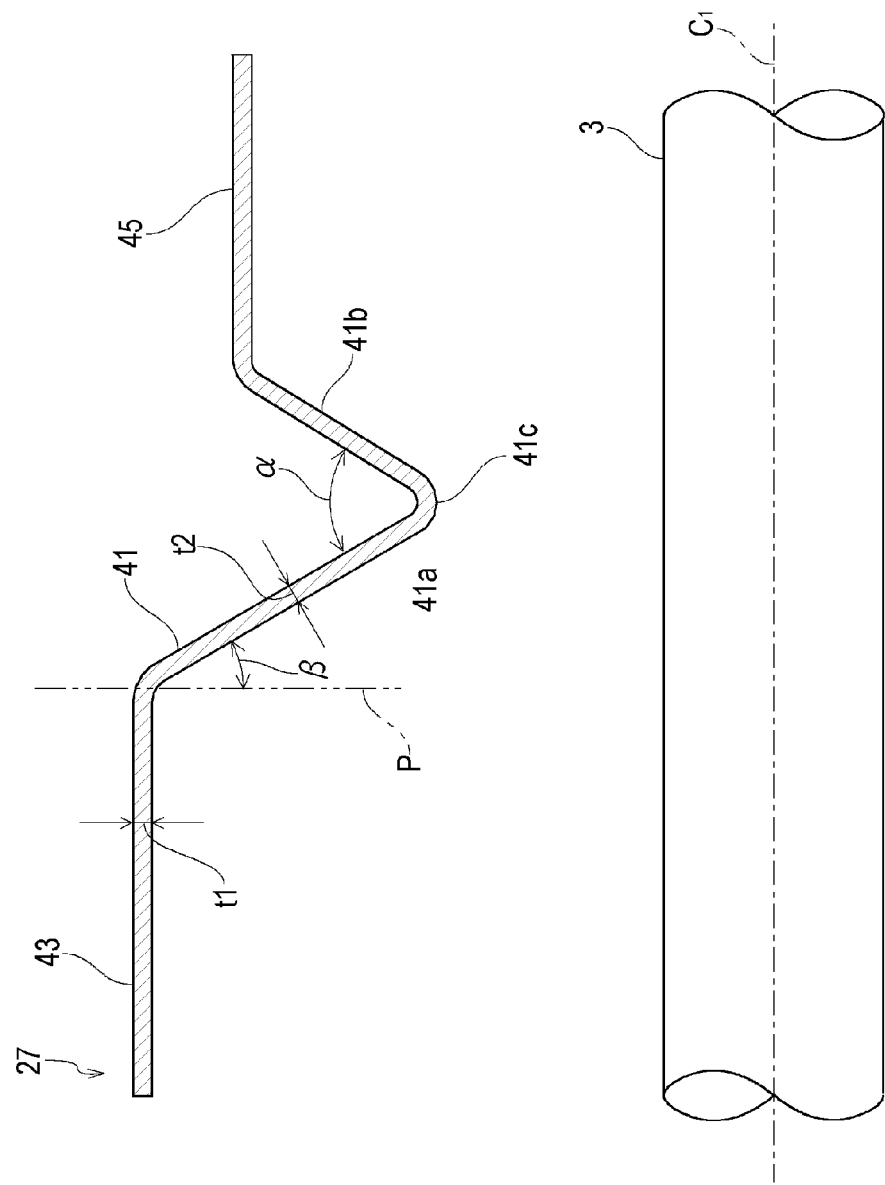
FIG. 3 is a cross-sectional view showing, in an enlarged manner, a flexible support used in the planetary gear reducer of FIG. 1.

As shown in FIG. 3 which is an enlarged view of the flexible support 27 of FIG. 2, the angle α of the V shape in the longitudinal section of the flexible structure 41 is preferably in the range of 30°≤α≤90°, and more preferably, in the range of 45°≤α≤75°. In the present embodiment, the angle α of the V shape is set to approximately 60°. Further, the slope angle of the front inclined portion 41a of the flexible structure 41, that is, an angle β formed by the front inclined portion 41a and an imaginary plane P perpendicular to the central axis $C_1$ of the input shaft 3, is preferably in the range of 15°≤β≤60°, and more preferably, in the range of 30°≤β≤45°. Particularly when the value of β is set to 30° or greater, the strength of the flexible support 27 against buckling is improved significantly.

The wall thickness t1 of the larger-diameter cylindrical portion 43 of the flexible support 27 is set to be smaller than the wall thickness t2 of the flexible structure 41. More specifically, it is preferred that the wall thickness t1 of the larger-diameter cylindrical portion 43 is set to be in a range from 85% to 95% of the wall thickness t2 of the flexible structure 41. In the present embodiment, the wall thickness t1 of the larger-diameter cylindrical portion 43 is set to be 90% of the wall thickness t2 of the flexible structure 41. In this manner, the wall thickness t1 of the larger-diameter cylindrical portion 43, which is a larger diameter portion subjected to less shear force, is set to be smaller. This makes it possible to reduce the weight of the planetary gear reducer 1 while maintaining necessary strength against buckling.

Hereinafter, the structure connecting the ring gear 9 and the flexible support 27 is described. As shown in FIG. 2, an outward flange 51 protruding radially outward is provided at the outer peripheral portion of the ring gear 9, and an inward flange 53 protruding radially inward is provided at the inner peripheral portion of the front end of the flexible support 27. The outward flange 51 of the ring gear 9 is entirely circumferentially provided along the outer peripheral portion of the ring gear 9. The inward flange 53 of the flexible support 27 is entirely circumferentially provided along the inner peripheral portion of the flexible support 27.

Figure 4:
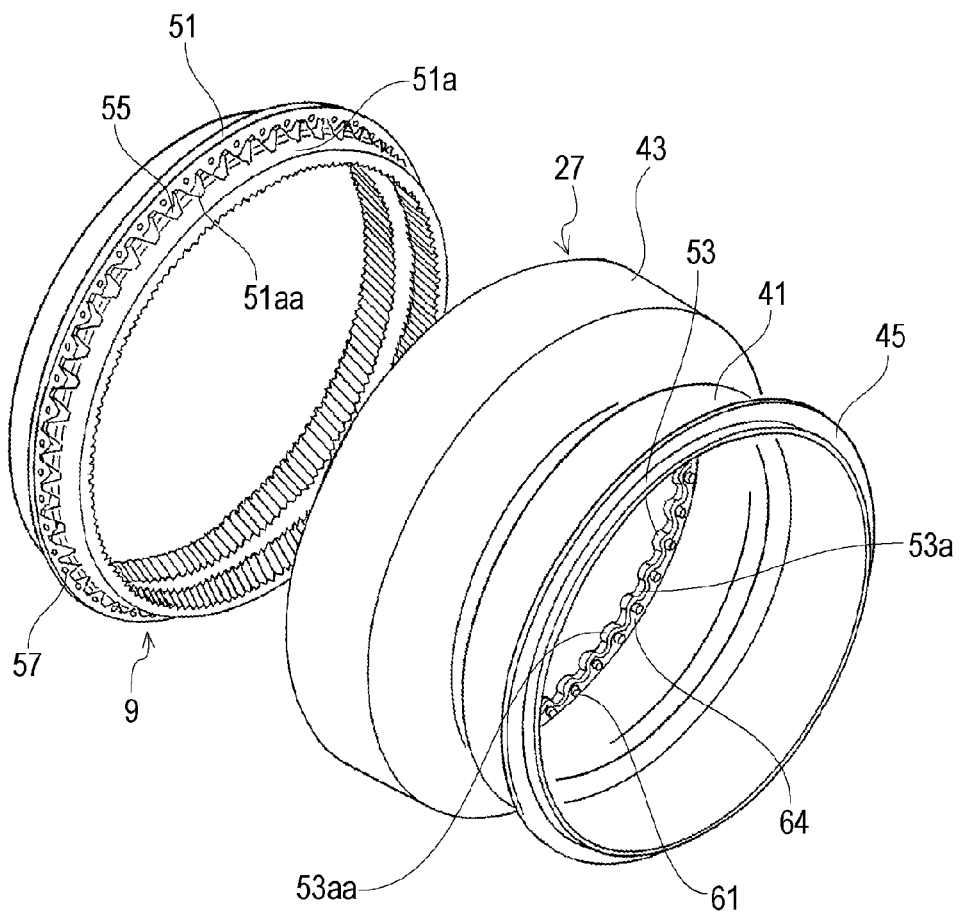
FIG. 4 is an exploded perspective view showing a structure connecting the flexible support and a ring gear of the planetary gear reducer of FIG. 1.

As shown in FIG. 4, a connection portion 51a of the outward flange 51, and a connection portion 53a of the inward flange 53, are each configured in the form of a chevron-shaped (mountain-shaped or inverted V-shaped) pattern in which wave-like shapes are arranged in a circumferential direction, i.e., formed as wave-shaped counterbores. The outward flange 51 of the ring gear 9 is provided with an annular connection wall 55 which covers the front side of the connection portion 51a. Bolt insertion holes 57, which are through holes extending in the central axis direction, are formed in the connection wall 55 at circumferential positions corresponding to respective trough portions 51aa of the connection portion 51a. Bolt insertion holes 59 (see FIG. 2), which are through holes extending in the central axis direction, are formed in respective crest portions 53aa of the connection portion 53a of the inward flange 53 of the flexible support 27. Further, connection nuts 61 serving as shank nuts are provided at the rear end of the bolt insertion holes 59 of the respective crest portions 53aa. It should be noted that the connection nuts 61 are fixed to the inward flange 53 in such a manner that the rotation of each connection nut 61 is locked by a locking plate 64 which is fixed to the inward flange 53 by a rivet.

At the outward flange 51 of the ring gear 9 and the inward flange 53 of the flexible support 27 having the above configuration, the connection portions 51a and 53a are fitted together, such that the crest portions 53aa of the connection portion 53a of the inward flange 53 of the flexible support 27 fit into the trough portions 51aa of the connection portion 51a of the outward flange 51 of the ring gear 9. Here, when seen in the direction of the central axis $C_1$, there is an engagement interface between the outward flange 51 of the ring gear 9 and the inward flange 53 of the flexible support 27. The shape of the engagement interface is such that the chevron-shaped (mountain-shaped or inverted V-shaped) patterns are combined along the circumferential direction. Further, as shown in FIG. 2, connection bolts 63 are inserted into the bolt insertion holes 57 and 59 from the ring gear 9 side and are screwed into the connection nuts 61. As a result, the ring gear 9 and the flexible support 27 are connected in such a manner that they cannot rotate relative to each other.

As described above, the outward flange 51 of the ring gear 9 and the inward flange 53 of the flexible support 27 are used to connect the ring gear 9 and the flexible support 27. As a result, an increase in the external dimensions of the planetary gear reducer 1 is suppressed or the external dimensions are reduced, which makes it possible to reduce the size and weight of the engine in which the gear reducer 1 is installed. Moreover, since the connection portions 51a and 53a connecting the outward flange 51 and the inward flange 53 are each configured in the form of a chevron-shaped pattern, the weight of the planetary gear reducer 1 can be reduced while maintaining the rigidity of the ring gear 9.

The planetary gear reducer 1 according to the above-described embodiment is configured such that, among three input/output components supporting the planetary gear reducer 1, i.e., the input shaft 3, the planet carrier 11, and the flexible support 27, only the flexible support 27 is provided with the flexible structure 41 which has a V-shaped cross section and low rigidity. Accordingly, sufficient rigidity of the planetary gear reducer 1 for preventing the whirling of the gear reducer 1 is obtained. In addition, deformation of the engine structure due to flight loads and the like is absorbed by the flexible structure 41, and thereby the occurrence of misalignment is prevented. As a result, the occurrence of edge contact at the gears or bearings is suppressed, and the life performance of the planetary gear reducer 1 is improved significantly. Moreover, the engine in which the planetary gear reducer 1 is installed has such a structure as to support the planetary gear reducer 1 at one end of the gear reducer. Accordingly, an increase in the engine weight is suppressed. In particular, the angle α of the V shape in the longitudinal section of the flexible structure 41 is set to be in the range of $30° \leq \alpha \leq 90°$. This makes it possible to obtain suitable flexibility for preventing misalignment while maintaining sufficient strength against the buckling of the flexible support 27.

Although a preferred embodiment of the present invention is as described above with reference to the drawings, various additions, modifications, and deletions may be made to the above embodiment without departing from the spirit of the present invention. Therefore, such additions, modifications, and deletions also fall within the scope of the present invention.

INDUSTRIAL APPLICABILITY

The planetary gear reducer according to the present invention is applicable to power transmission mechanisms for use in extracting power from a power source such as an aircraft gas turbine engine.

REFERENCE SIGNS LIST 1 planetary gear reducer
3 input shaft
5 sun gear
7 planet gear
9 ring gear
11 planet carrier
13 planet shaft
17 front plate
19 stub shaft
21 back plate
27 flexible support (cylindrical support)
41 flexible structure

The invention claimed is:

1. A planetary gear reducer comprising:
a sun gear fixed concentrically to a power input shaft;
a ring gear provided along an outer periphery of the sun gear;
a plurality of planet gears meshing with the sun gear and the ring gear;
a plurality of planet shafts, each of which is a rotational axis of a corresponding one of the plurality of planet gears;
a planet carrier configured to support the plurality of planet shafts, and to output revolution of the plurality of planet gears around the input shaft as first power; and
a cylindrical support including, at its one part along a direction of a central axis of the input shaft, a flexible structure which is curved radially inward and has a V-shaped longitudinal section, the cylindrical support being connected to the ring gear such that the cylindrical support is non-rotatable relative to the ring gear, the cylindrical support being configured to output rotation of the ring gear as second power.

2. The planetary gear reducer according to claim 1, wherein an angle of the V-shape of the longitudinal section of the flexible structure is in a range from 30° to 90°.

3. The planetary gear reducer according to claim 2, wherein the cylindrical support includes a larger-diameter cylindrical portion and a smaller-diameter cylindrical portion, the larger-diameter cylindrical portion being formed nearer to the ring gear than the flexible structure and having a wall thickness smaller than that of the flexible structure, the smaller-diameter cylindrical portion being formed nearer to an output side of the cylindrical support than the flexible structure.

4. The planetary gear reducer according to claim 1, wherein the cylindrical support includes a larger-diameter cylindrical portion and a smaller-diameter cylindrical portion, the larger-diameter cylindrical portion being formed nearer to the ring gear than the flexible structure and having a wall thickness smaller than that of the flexible structure, the smaller-diameter cylindrical portion being formed nearer to an output side of the cylindrical support than the flexible structure.

5. The planetary gear reducer according to claim 4, wherein the wall thickness of the larger-diameter cylindrical portion is in a range from 85% to 95% of the wall thickness of the flexible structure.

6. The planetary gear reducer according to claim 4, wherein the flexible structure includes a tapered shape which is formed so as to be inclined radially inward from the larger-diameter cylindrical portion, such that the tapered shape is inclined relative to the direction of the central axis of the input shaft in a range from 45° to 60°.

7. The planetary gear reducer according to claim 1, wherein the ring gear includes an outward flange protruding radially outward,
the cylindrical support includes an inward flange protruding radially inward, and
the ring gear and the cylindrical support are connected to each other via the outward flange and the inward flange.

8. The planetary gear reducer according to claim 7, wherein connection portions connecting the outward flange and the inward flange are each configured in a form of a chevron-shaped pattern.

9. The planetary gear reducer according to claim 8, wherein the outward flange protrudes in the direction of the central axis of the input shaft toward the cylindrical support, and includes an annular connection wall having an outer periphery whose shape is such that crests and troughs are formed alternately, and
the inward flange has an inner periphery whose shape is such that crests and troughs are formed alternately, and the crests and troughs mesh with the crests and troughs of the outer periphery of the connection wall.

10. The planetary gear reducer according to claim 7, wherein
the outward flange protrudes in the direction of the central axis of the input shaft toward the cylindrical support, and includes an annular connection wall having an outer periphery whose shape is such that crests and troughs are formed alternately, and
the inward flange has an inner periphery whose shape is such that crests and troughs are formed alternately, and the crests and troughs mesh with the crests and troughs of the outer periphery of the connection wall.

* * * * *